United States Patent [19]

Stewart

[11] 4,074,737
[45] Feb. 21, 1978

[54] WOOD PLANER CUTTERHEAD DESIGN FOR REDUCED NOISE LEVEL

[76] Inventor: John S. Stewart, P. O. Box 5670, Greensboro, N.C. 27403

[21] Appl. No.: 609,291

[22] Filed: Sept. 2, 1975

[51] Int. Cl.² .............................................. B27C 1/00
[52] U.S. Cl. ................................... 144/117 R; 144/218; 144/221; 144/230; 181/211; 241/294; 417/51
[58] Field of Search ................... 144/172, 117 R, 218, 144/221, 230, 326 R, 326 A, 326 B, 326 C, 114 R; 241/293, 294, 295, 292.1; 29/105 R; 181/33 B, 33 P, 33 C, 33 D

[56] References Cited

U.S. PATENT DOCUMENTS

| | | | |
|---|---|---|---|
| 1,194,865 | 8/1916 | Müller | 144/230 X |
| 1,278,629 | 9/1918 | Francis | 144/221 X |
| 1,359,179 | 11/1920 | Lassiter | 29/105 |
| 2,549,251 | 4/1951 | Skelton | 144/221 |
| 2,865,572 | 12/1958 | Launert | 241/294 |
| 3,080,014 | 3/1963 | Dahl | 181/33 P |
| 3,589,468 | 6/1971 | Rowand, Jr. | 181/33 B |
| 3,908,497 | 9/1975 | Shah | 181/330 B X |

FOREIGN PATENT DOCUMENTS

| | | | |
|---|---|---|---|
| 342,381 | 2/1931 | United Kingdom | 144/230 |
| 350,083 | 6/1931 | United Kingdom | 144/230 |
| 1,226,604 | 3/1971 | United Kingdom | 144/230 |
| 1,323,272 | 7/1973 | United Kingdom | 144/230 |

Primary Examiner—Othell M. Simpson
Attorney, Agent, or Firm—David Rabin

[57] ABSTRACT

A helical cutterhead for a wood planer for reducing noise level during planing by supressing vibration and sound radiation by having more than one knife blade engaged in the workpiece at any instant by satisfying the minimum condition of the formula $L = \pi D \cot\phi/N$ is less than the workpiece width and in which L is the contact distance, D is the cutterhead diameter, N is the number of knife blades, and $\phi$ is the helix angle, and in which L is less than 4 inches.

9 Claims, 9 Drawing Figures

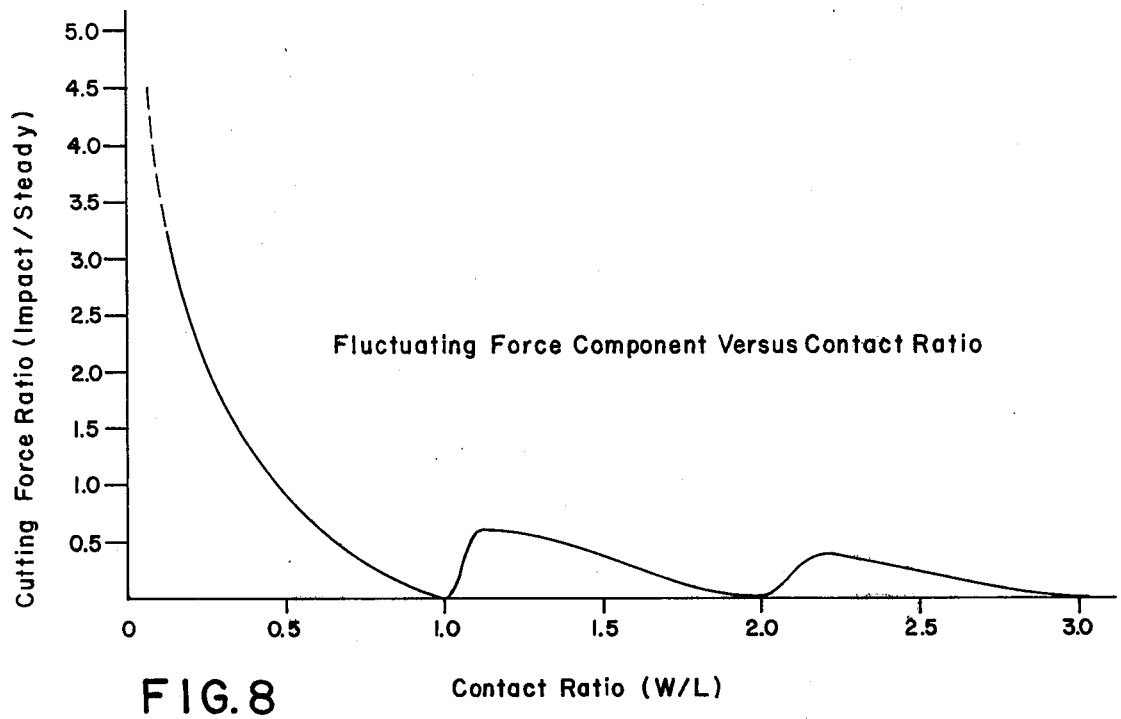
FIG. 8
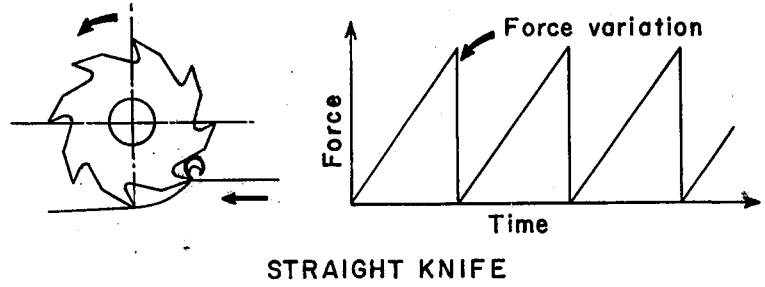
FIG. 7a  STRAIGHT KNIFE
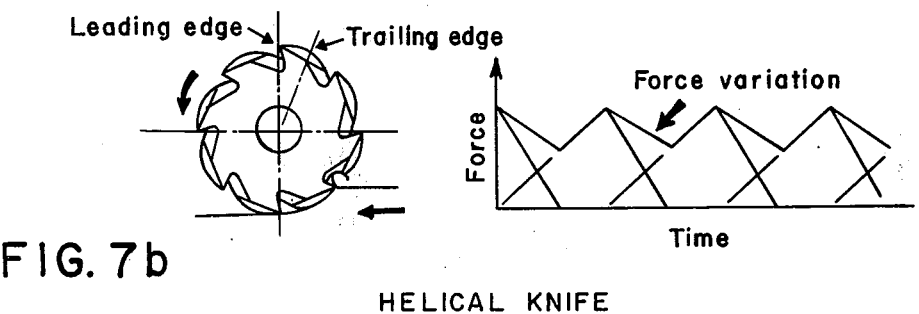
FIG. 7b  HELICAL KNIFE

WOOD PLANER CUTTERHEAD DESIGN FOR REDUCED NOISE LEVEL

BACKGROUND, ADVANTAGES AND OBJECTIVES OF THE INVENTION

Conventional wood planers generate objectionably high noise levels which can be readily associated with reverberant vibration approximately the production of the resistive part of the radiation impedance and the square of the space-time averaged transverse vibrational velocity which forms the acoustic power radiation. The radiation resistance constitutes one of the components of the acoustic efficiency of the source, the radiating area, and the properties of the reverberant workpiece. The resulting sound generation from a vibrating workpiece increases with increased workpiece width and generally increases in the magnitude of approximately six decibels upon doubling of workpiece width. This characteristic results from the sound spectra by frequency components approaching the critical frequency of the workpiece. Although it has been conventional to employ helical cutterheads for wood planers with continuous cutting blades and a low helix angle, as well as a number of knife blades, minimal attention has been directed to the generation of the high noise level until governmental standards have imposed certain restrictions. Although many types of conventional wood planar cutterheads employ replaceable cutter segments, and achieve high efficiency in cutting rates, these conventional cutterheads are extremely noisy and the noise level increases substantially with the width of the material being planed. Reduction of wood planer noise levels from workpiece vibration is not only desirable but mandatory at this time, and reduction in radiation resistance and workpiece vibrational velocity are highly desirable to achieve reduced levels of noise during cutting in cutterhead design utilizing a continuous cutting blade, high helix angle, and a relationship between the factors of helix angle, cutterhead diameter and the number of knife blades which are in continuous contact with the workpiece.

Accordingly, it is an objective of this invention to provide a helical cutterhead for wood planers which will reduce noise level by reducing radiation resistance and vibrational velocity by having more than one knife blade engage the workpiece at any instant.

Another objective of this invention is the provision of a helical cutterhead for wood planers which will effectively reduce the noise level during the cutting or planing action by providing a helical cutterhead in which the helix angle is designed by taking into consideration a continuous cutting edge, high helix angle, a relationship between helix angle, cutterhead diameter, and the number of knife blades that will insure continuous contact between the cutterhead and the workpiece whereby more than one knife blade will engage the workpiece at any instant by satisfying the minimum formula condition of $L = \pi D \cot\phi/N$ in which L is the contact distance, D is the cutterhead diameter, N is the number of knife blades, and $\phi$ is the helix angle of the knife whether a continuous blade or a series of segments constituting the cutting blade along the helical blade angle, and the resulting L is less than 4 inches.

Other objectives and many of the attendant advantages of this invention will become more readily known to those skilled in the woodworking technology from the accompanying drawing and a detailed description of one preferred embodiment of this invention.

DESCRIPTION OF THE DRAWING

FIG. 7a is a diagram of a graph illusrating the relationship of cutting force and time for a straight knife for a series of three blades and illustrating a straight knife cutter;

FIG. 7b is a graph illustrating cutting force plotted against time for three teeth of a helical cutter head and illustrating a helical knife cutterhead with the effect of helix angle on force deflections for three blades; and FIG. 8 is a graph representing cutting force ratio plotted against contact ratio.

DETAILED DESCRIPTION OF A PREFERRED EMBODIMENT OF THE INVENTION

Figure 1:
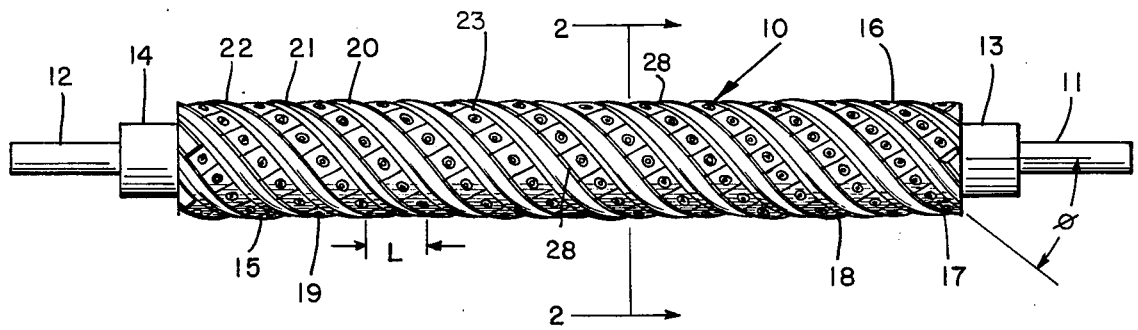
FIG. 1 of a front elevational view of a helical cutterhead embodying this invention including a series of segmented helical knives.

Referring to the drawings and particularly to FIG. 1, there is illustrated a cutterhead 10 for a wood planar incorporating one embodiment of this invention in which axially-extending stub shaft ends 11 and 12 may be bearingly supported for rotation in a wood planer. An intermediate section 13 and 14 at each end of the cutterhead may be provided depending upon the type of planar employed and space requiremenets, particularly in existing planers for retrofitting. The main cylindrical body 15 of the cutterhead is provided with a series of helical grooves or indentations in circumferentially-spaced relationship throughout the main cylindrical body 15 of the cutterhead 10.

In the embodiment illustrated in FIG. 1, a series of segmented cutter bits 23 is removeably secured to the cutterhead body 15 within the helical grooves and in abutting cooperative relationship with each other and the grooves to form substantially continuous cutting edges 20, 21, and 22 for each of the helices although the individual segmented cutter bits 23 may be removed individually. Grinding the cutting edges may be performed while the cutterhead is mounted in position on the planer or removed therefrom for a separate grinding operation in which the entire cutterhead or the individual cutter bit edges may be ground accurately in position on the cylindrical body to enable a continuous edge to be formed utilizing the segmented bits or the individual segmented bits are mounted in a suitable fixture for grinding to a predetermined height.

It has been found that the noise level during planing operations may be reduced appreciably by having more than one cutting edge contact the surface of the workpiece being planed. It has also been determined that very substantial relative reduction in noise level is achieved by the application of the formula $L = \pi D \cot\phi/N$ in which L is the distance between adjacent helical cutting blades, D is the cutterhead diameter, N is the number of knife blades, and $\phi$ is the helix angle formed by the axis of the cutterhead and one of the cutterhead blades and in which L is less than 4 inches. Whenever L is less than the width of the workpiece, it is highly desirable that more than one knife edge of the cutterhead engage the workpiece at any instant. It has been further determined that for effective workpiece vibration control, the ratio of W/L, while desirably should be greater than unity as will be determined from an examination of the graph illustrated in FIG. 8, for optimum results L should be less than 4 inches. In FIG. 8 the ordinate is the cutting force ratio (or impact/steady), and the abscissa is the contact ratio (or W/L), in which W is the width of the workpiece, and L is the contact distance or spacing between adjacent helical cutting blades on the cylindrical body of the cutterhead. For a straight line cutting edge that is parallel with the axis of the cutterhead, the fluctuating force component versus contact ratio in FIG. 8 rises very sharply as opposed to the contact ratio points from 1.0 to 3.0. Accordingly, for effective workpiece vibration control, the ratio of W/L would achieve greater control when values above 1.0 are obtained as shown in FIG. 8.

The result of cutting force plotted against time is shown in FIG. 7a in which a cutterhead with a straight knife having at least three separate straight cutting blades is employed in which the contact ratio (W/L) is equal to zero. In contrast, the cutting force plotted against time for a helical cutter having a series of at least three separate cutting blades in which the contact ratio of W/L is greater than one is shown in FIG. 7b thereby illustrating the increased time of contact when the helical cutting blades are employed. The present invention employs the series of helical blades in which the ratio of W/L is preferably not less than unity and the value of L is less than 4 inches in the aforementioned formula in the value of L as the contact distance or spacing between adjacent helical cutting blades.

Figure 2:
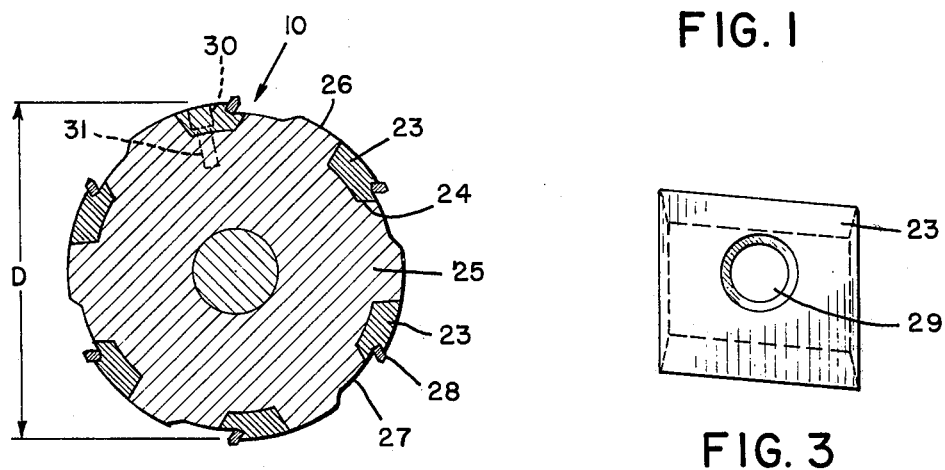
FIG. 2 is an enlarged transverse sectional view taken substantially along the line of 2—2 of FIG. 1.

There is illustrated in FIG. 2 a cutterhead having 6 helical blades of segmented cutter knife bits 23 that are circumferentially-spaced from other helical blades and segmented bits 23 mounted in cooperating or receiving grooves 24 in the cutterhead body 25 on the outer surface 26 thereof with appropriate undercuts 27 positioned in advance of the cutting edge 28 on the bits 23. Each edge 28 of the segmented bits 23 is securely mounted to each of the segmented bit 23 along one edge thereof, to form the substantially continuous cutting edges 20, 21 and 22, and may be made of tool steel or tungsten carbide or other appropriate material. In some applications, the cutterhead may be integrally made utilizing helical cutting edges that are formed in the cutterhead without removable segmented cutter bits.

In the embodiment illustrated in FIGS. 1 and 2, the individual segmented bits 23 may be forged or otherwise formed by machining suitably to fit securely within the machined grooves 24. A recessed bore 29 is provided in each of the segmented bits 23 for cooperatively receiving and recessing the head 30 of a securing lug 31 which is threadably engaged in the cutterhead body 25 to facilitate positioning and removal of each segmented bit 23 for inserting a new one or to remove a worn one without disturbing adjacent segmented bits.

Figure 3:
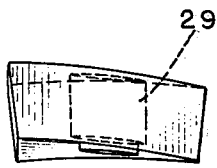
FIG. 3 is an enlarged top plan view of a segmented cutter bit.
Figure 5:
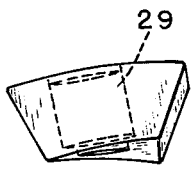
FIG. 5 is a side perspective view of a segmented cutter bit of FIGS. 3 and 4.
Figure 4:
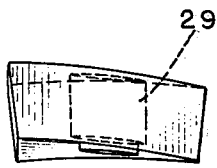
FIG. 4 is a side elevational view of FIG. 3.
Figure 6:
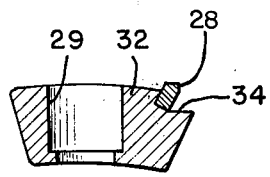
FIG. 6 is a transverse sectional view of a bit cutter with a cutting edge positioned thereon.

The contour of each segmented bit 23 preferably follows the configuration of the helical groove in the cutterhead so that there will be a minimum of displacement of each segmented bit when secured in position by abutting adjacent segmented bits and the walls of the groove 24. The configurations of one such segmented bit is illustrated in FIGS. 3, 4, and 5 omitting therefrom the cutting edge 28 which is shown in segment 32 as a short protruding edge 28 secured to the undercut leading edge 34 of the segment 32 to which the edge may be brazed or welded depending upon the materials employed.

Extensive research has been conducted in wood planer noise and its control and includes reference to radiation impedance, vibrational velocity and radiation resistance which reflect acoustic efficiency as well as the properties of the material being processed and is set forth in a study and report entitled: "A Theoretical And Experimental Study of Wood Planar Noise And Its Control" by John S. Stewart in August 1972 for the Center for Acoustical Studies, Department of Mechanical and Aerospace Engineering, North Carolina State University, Raleigh, North Carolina. Based on these theoretical and experimental studies and subsequent investigations and experiments, the subject matter of the cutterhead for a wood planer have been designed.

A comparison of noise levels has been conducted at the operator position for wood planers equipped with conventional cutterheads and helical cutterheads incorporating this invention, and the following data have been obtained:

I. Operational Conditions
   (a) machine - single surfacer
   (b) material - red oak
   (c) depth of cut - 1/8"
   (d) feed speed - 60 fpm
   (e) material thickness - 1"
   (f) material length - 5'

II. Noise Levels Present At Operator Position (±1 dBA) (4' from machine)

| Material Width | Standard Machine (dBA) | Helical Cutterhead (dBA) |
|---|---|---|
| idle | 91 | 78 |
| 2" | 90 | 81 |
| 4" | 95 | 81 |
| 6" | 98 | 80 |
| 8" | 101 | 81 |
| 10" | 103 | 82 |
| 12" | 104 | 85 |
| 24" | 108 | 87 |

The reduction in the noise levels between the standard machine and the helical cutterhead has been found to be significant in actual operation.

The cutterhead design of this invention is such that the combination of helix angle and number of knife blades on the cutterhead defines a distance L ($L = \pi D \cot\phi/N$) that provides for more than one knife blade to be in contact with the workpiece at all times whenever L is less than W, the workpiece width. The design is such that whenever the workpiece is less than L, the workpiece is so narrow that it is an inefficient sound radiator. This is reflected in the following diagram and in FIG. 8:

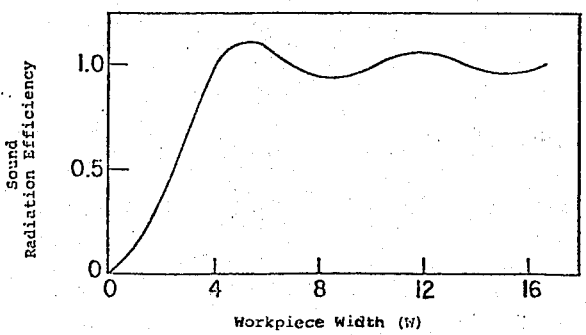

Sound radiation can be expressed in terms of the workpiece vibrational velocity and the source efficiency, or Power $\sim E \cdot V \sim E \cdot F_f$ where
- $E$ = efficiency of radiaion
- $V$ = workpiece vibrational velocity; mainly proportional to the fluctuating force $F_f$ From the above graph and FIG. 8, it will be observed that for W/L greater than unity or W less than 4 inches, radiation is reduced. Sound radiation is reduced when the value of L is less than 4 inches due to:

1. W/L is greater than unity for cases when the stock or workpiece width exceeds 4 inches; or
2. W is less than 4 inches and, according to the above diagram, the workpiece width is an inefficient radiator of sound.

I claim:

1. A wood planer cutterhead for reducing noise level comprising: a rotatable shaft, a cylindrical cutterhead mounted on said shaft, a series of helically mounted cutting blades mounted on said cutterhead, said cutting blades being spaced circumferentially on said cutterhead and positioned to simultaneously engage a surface to be cut to reduce noise level, the spacing between said cutting blades being in accordance with the formula $L = \pi D \cot\phi / N$ in which L is the linear distance between adjacent helical cutting blades, D is the cutterhead diameter, N is the number of cutting blades and $\phi$ is the helix angle, and the ratio of W/L, in which W is the width of the workpiece, is greater than 1.

2. A wood planer cutterhead as claimed in claim 1 wherein said series of helically mounted cutting blades are articulated on said cutterhead.

3. A wood planer cutterhead as claimed in claim 2, wherein each of said helically mounted cutting blades form a continuous edge.

4. A wood planer cutterhead as claimed in claim 1, said cylindrical cutterhead having cutting blades being mounted in said helical grooves, and means for releasably retaining each of said cutting blades in said helical grooves.

5. A wood planer cutterhead as claimed in claim 1, said helical cutting blades including tungsten carbide tips.

6. A wood planer cutterhead as claimed in claim 2 wherein each of said cutting blades have tungsten carbide tips.

7. A wood planer cutterhead as claimed in claim 1 wherein each of said cutting blades are of tool steel.

8. A wood planer cutterhead as claimed in claim 4 wherein each of said cutting blades are articulated and abutt in cooperative relationship in said helical grooves.

9. A wood planer cutterhead as claimed in claim 1, in which the value of L is less than 4, and W/L is less than or equal to 1.

* * * * *